March 28, 1961 R. E. DURHAM, JR 2,976,895
WIRE CUTTING AND ORIENTING APPARATUS
Filed June 11, 1957 9 Sheets-Sheet 1

INVENTOR.
RAYMOND E. DURHAM JR.
BY Donald F. Voss
ATTORNEY

FIG_2

FIG_3

March 28, 1961  R. E. DURHAM, JR  2,976,895
WIRE CUTTING AND ORIENTING APPARATUS
Filed June 11, 1957  9 Sheets-Sheet 3

FIG_4

FIG_6

FIG_5

FIG_7

FIG_8

FIG_9a

FIG_9b

FIG_9c

FIG_9d

FIG_10a

FIG_10b

FIG_10c

March 28, 1961 R. E. DURHAM, JR 2,976,895
WIRE CUTTING AND ORIENTING APPARATUS
Filed June 11, 1957 9 Sheets-Sheet 9

United States Patent Office 2,976,895
Patented Mar. 28, 1961

2,976,895

WIRE CUTTING AND ORIENTING APPARATUS

Raymond E. Durham, Jr., Vestal, N.Y., assignor to International Business Machines Corporation, New York, N.Y., a corporation of New York Filed June 11, 1957, Ser. No. 664,980

17 Claims. (Cl. 140—102)

This invention relates to apparatus for orienting and cutting off wires to facilitate the attachment of terminals to the ends of the wires.

In providing wires for subsequent application of terminals, it is very desirable to be able to cut accurate lengths of wire at rapid rates and orient the position of the wire to receive terminals at the time of cutting, thereby reducing the handling of the wire.

Accordingly, an object of this invention is to provide a device for cutting wires to an accurate length at a rapid rate.

Another object of this invention is to provide a device for cutting wires to variable lengths and orienting the cut wires in a predetermined manner without increasing the size of the device to accommodate the variable lengths cut.

Another object of this invention is to provide a carrier for receiving a cut and oriented wire and maintaining said wire in its oriented position.

Other objects of the invention will be pointed out in the following description and claims and illustrated in the accompanying drawings, which disclose, by way of examples, the principle of the invention and the best mode, which has been contemplated, of applying that principle.

In the drawings:

Figs. 9a, 9b, 9c and 9d are schematic views showing in sequence the action of the spreader plate in establishing the proper spacing between the legs of the loop of wire which is in the wire gripping means.

Figs. 10a, 10b, 10c, 10d, 10e and 10f are schematic views showing in sequence the action and relative positions of the wire rotating means in orienting the end of the wire from the wire supply and, subsequently, the forming of the loop which enters the wire gripping means as it is being formed.

Figure 7:
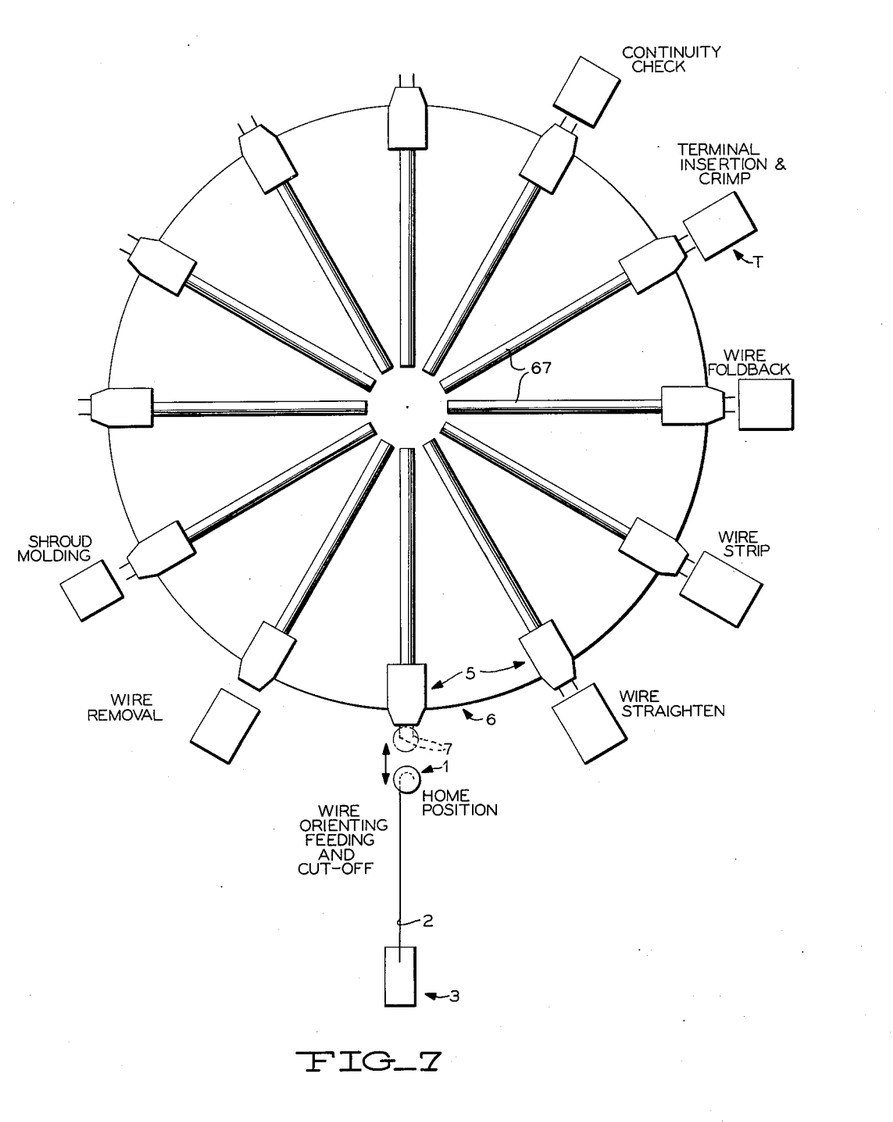
Fig. 7 is a schematic view showing the carrier, the wire rotating means and the various stations at which other operations are subsequently performed upon the oriented loop of wire transferred to the carrier.
Figure 8:
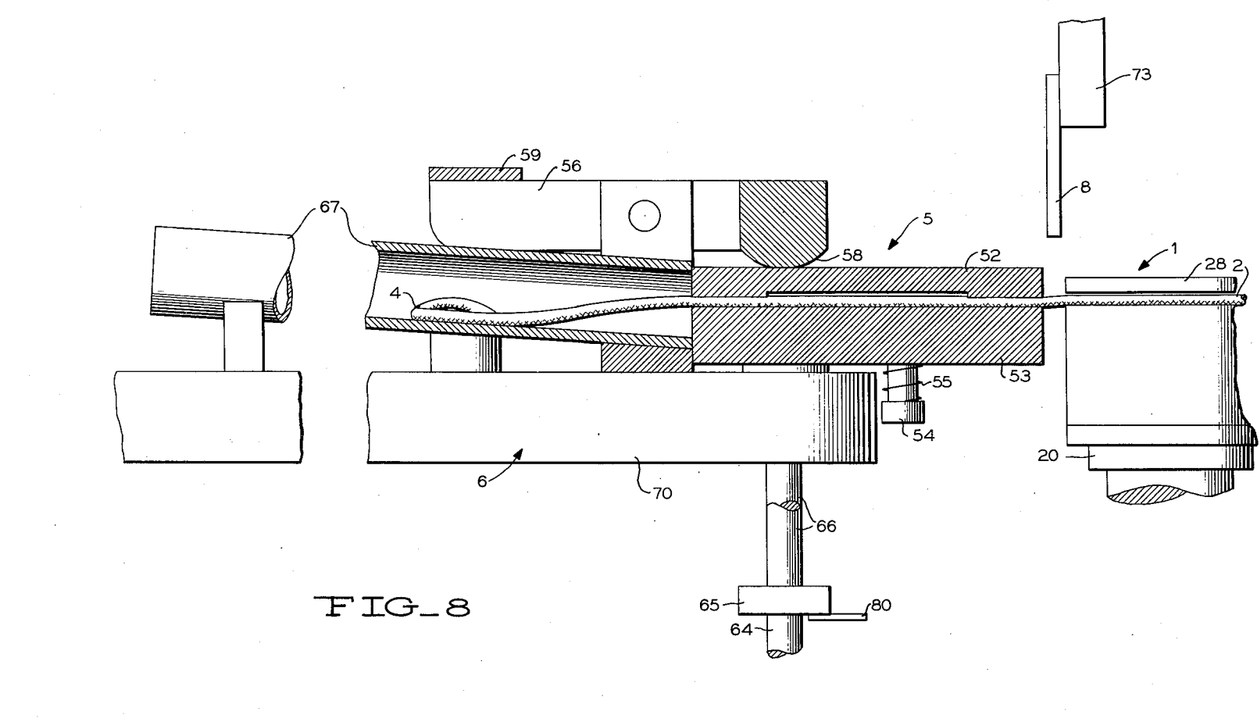
Fig. 8 is a side elevation partially in section of the gripper means, the spreader plate in its retracted position and the wire rotating means with the wire loop fully formed and gripped but still connected to the wire supply.
Figure 9A:
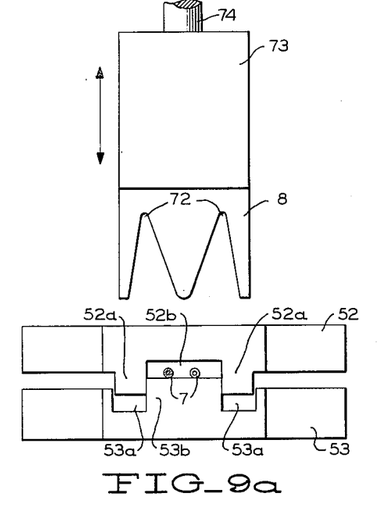
Fig. 9a shows the normal position of the legs of the wire loop before being spaced while in the wire gripping means which is in the open position, the spreader plate being retracted.
Figure 9B:
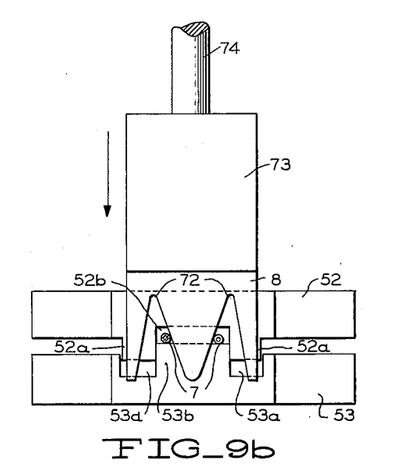
Fig. 9b shows the spreader plate having engaged the legs of the wire loop, while the wire gripping means is still in the open position.
Figure 9C:
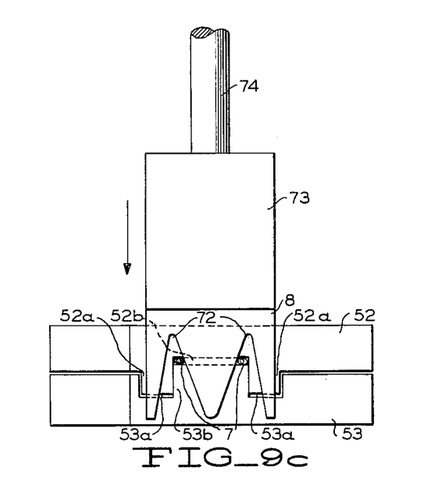
Fig. 9c shows the spreader plate having fully spaced the legs of the wire loop and the wire gripping means in the closed position.
Figure 9D:
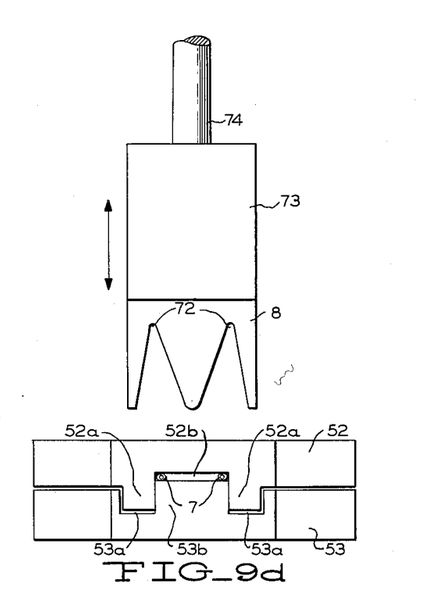
Fig. 9d shows the spreader plate in the retracted position and the loop of wire severed from the wire supply, the legs of the loop having been spaced and gripped by the wire gripping means.
Figure 10A:
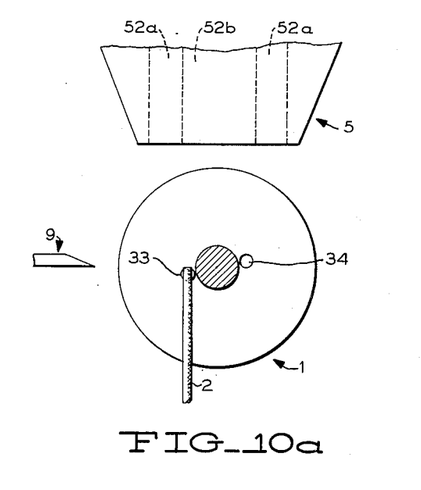
Fig. 10a shows the wire rotating means having gripped the end of the wire and in its position nearest the wire gripping means.
Figure 10B:
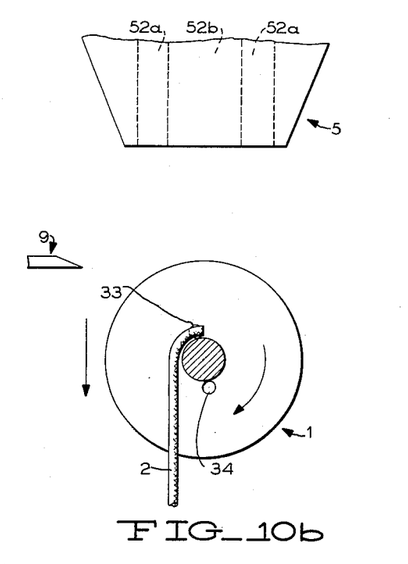
Fig. 10b shows the wire rotating means simultaneously retracting from the wire gripping means and rotating to start the orientation of the end of the wire.
Figure 10C:
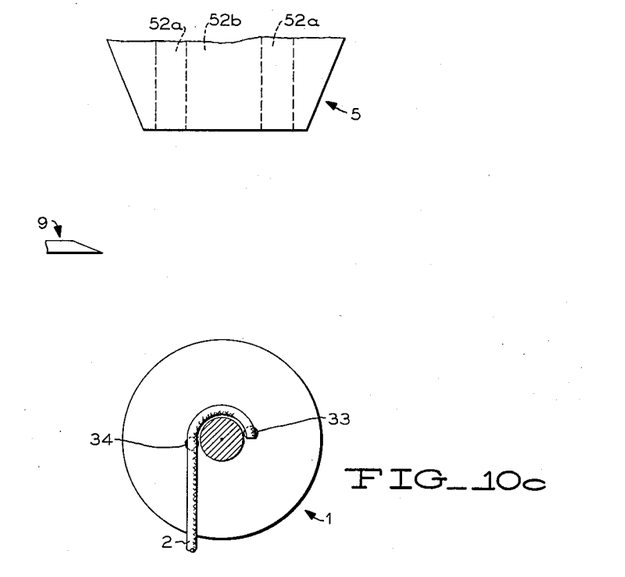
Fig. 10c shows the wire rotating means in its fully retracted position from the wire gripping means and with the end of the wire having been oriented 180 degrees.
Figure 10D:
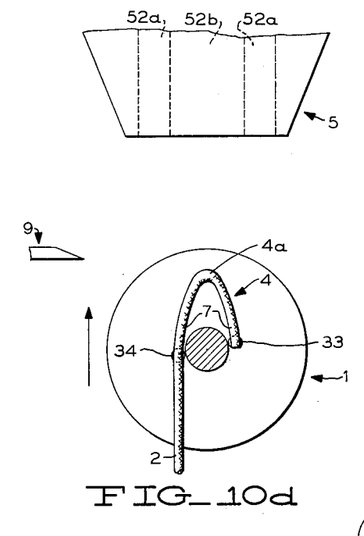
Fig. 10d shows the wire rotating means advancing toward the wire gripping means with the wire loop just starting to be formed.
Figure 10E:
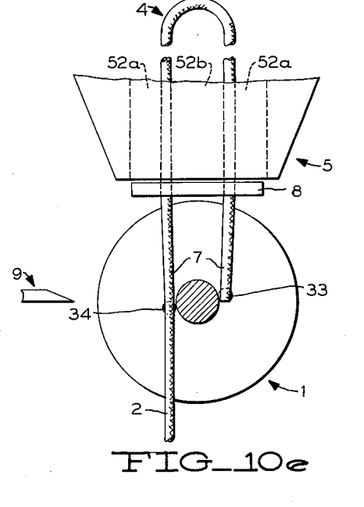
Fig. 10e shows the wire rotating means nearest the wire gripping means with the loop entered therein and with the spreader plate in position to establish the spacing between the legs of the wire loop.
Figure 10F:
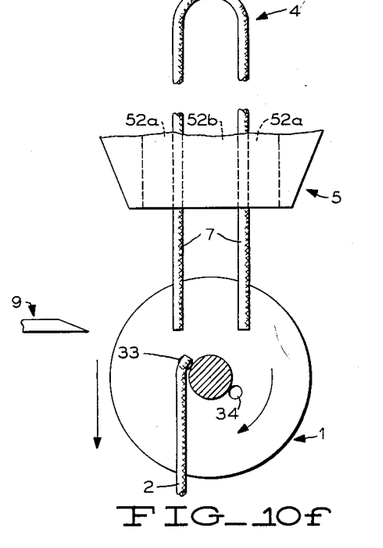
Fig. 10f shows the formed loop severed from the wire supply and the newly formed end gripped in the wire rotating means which is rotating and retracting away from the wire gripping means.

Briefly described, the invention comprises a wire rotating means 1 for receiving the end of a wire 2 from a wire supply S, gripping this end of wire and rotating it 180°, see Figs. 10a, 10b and 10c. Wire is then fed by a wire feeding device 3, Fig. 4, from the supply S in a suitable manner to a predetermined length, thereby forming a loop 4 of wire as in Figs. 8, 10d 10e and 10f. As the wire 2 is fed, the loop 4 being formed is guided into a wire gripping means 5 on a rotatable carrier 6, as in Figs. 8, 10d, 10e and 10f. Also the space between the wire forming the legs 7 of the loop 4 is established by a spreader plate 8, Figs. 9a, 9b, 9c and 9d, hence facilitating attachment of terminals by another device, schematically shown in Fig. 7, not forming a part if this invention. The wire gripping means 5 on the carrier 6 grips the wire loop 4 while the legs 7 protruding therefrom and maintained in the spaced position by the spreader plate 8, and subsequently, after the wire loop 4 is gripped, the spreader plate 8 is retracted to a remote position. The wire 2 in the form of the loop 4 is then severed from the supply S by a cutting means 9 and before the carrier 6 is indexed, the wire rotating means 1 is retracted to a remote position to permit the newly formed loop 4 to pass without interference and to orient the newly formed end of the wire. Further, before the wire is cut, the wire rotating means 1 grips what will be the newly formed end of wire running from the supply S and releases its grip on the end of the wire it had rotated 180°. Hence the net result is to have a portion of the wire 2 cut to a very accurate length in the form of the loop 4 where the wire forming the legs 7 of the loop 4 projecting from the gripping means 5 are maintained in a definite spaced relationship on the carrier 6. The carrier 6 indexes to present the legs 7 projecting from the gripping means 5 to a wire terminating station T where terminals, schematically shown in Fig. 7, are applied thereto. At the wire terminating station T, Fig. 7, it is required that the projecting legs 7 of the wire loop 4 be presented very accurately. Hence this requirement had been already met at the time the wire loop 4 was formed and severed from the wire supply S. It is of interest to note that control over the wire 2 is never lost from one operation to the next. This is especially true during the time the wire 2 is oriented and fed into the carrier 6.

The wire rotating means initially holds the end of the wire 1 from the supply S and then rotates the end of the wire 180°, and in this condition the loop of wire 4 is formed and fed into the carrier 6; however, before the carrier 6 assumes control of the wire loop 4, the wire forming the legs 7 of the loop 4 is properly spaced. Subsequent to the spacing, the loop 4 is gripped by the gripping means 5 on the carrier 6 but still while the wire loop 4 is also under control of the wire rotate mechanism 1 and feeding device 3. Hence, since the wire rotate mechanism 1 is gripping one end of the wire 2 forming the loop 4 and the wire feeding device 3 has control of the other end of the loop, the same will not collapse or spring back toward the wire rotate mechanism 1. As the wire rotate mechanism 1 loses control of the wire loop 4 to the carrier 6, it assumes control over the wire end from the wire supply S. The cycle repeats as the carrier 6 indexes to bring an empty wire gripping means 5 into position to receive a new wire loop 4.

*Detailed description*

Figure 1:
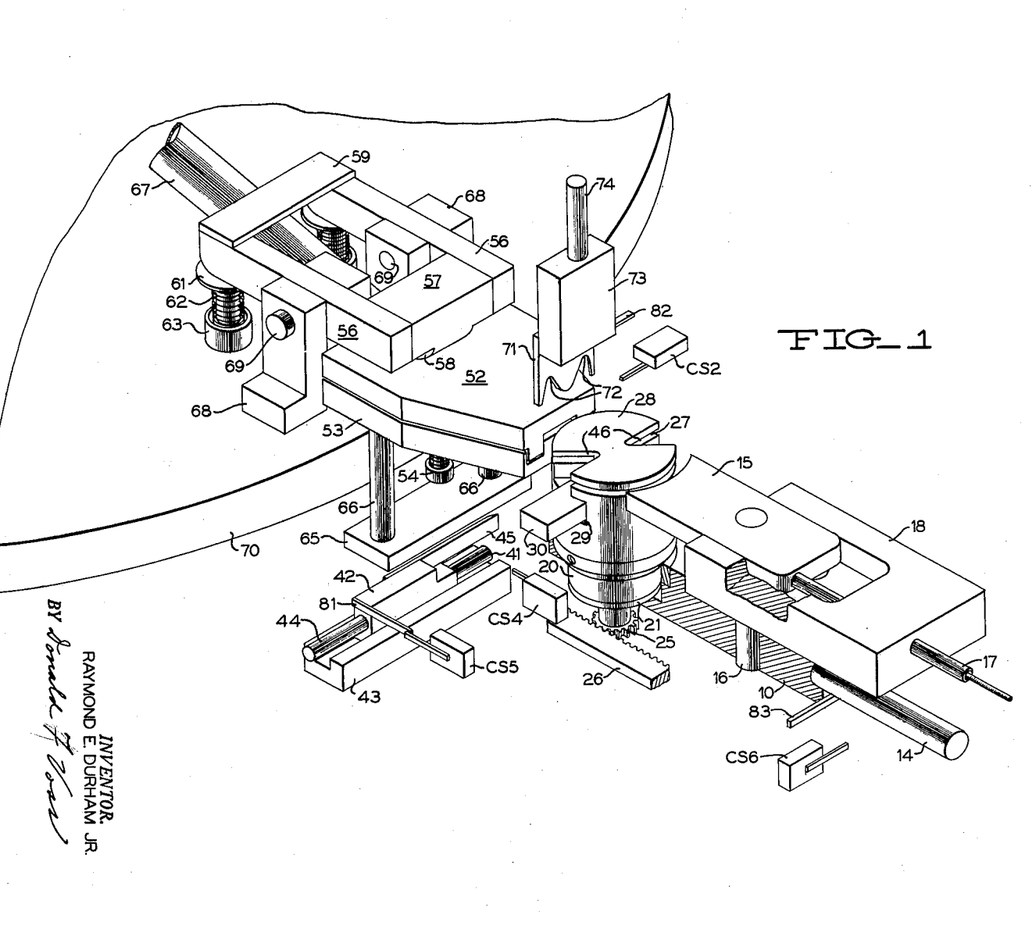
Fig. 1 is a perspective view of the apparatus embodying the invention.
Figure 2:
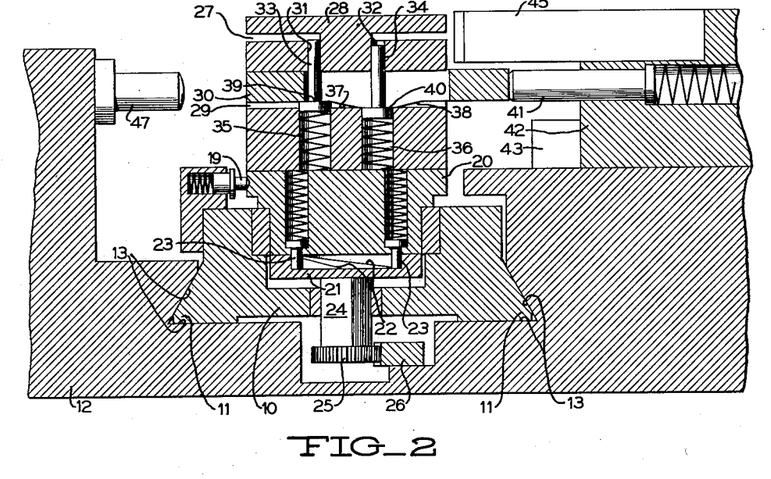
Fig. 2 is a side elevation partially in section and partially in full line of the wire rotating the wire cut-off mechanism.

Specifically, referring to Figs. 1 and 2, a movable slide member 10 having V-shaped ways 11 is mounted to slide in a fixed block 12 having guides 13 to receive the ways 11 respectively, thereby guiding the slide 10 in its movement. Movement of the slide 10 is actuated by an air cylinder, not shown, having a piston rod 14 fixed to the slide 10. The slide 10 carries a wire guide 15 spaced from and attached to the slide 10 by means of a dowel rod 16, and the wire guide 15 is drilled to receive a guide tube 17 adapted to slide in a hole provided in a frame member 18 attached to the fixed block 12. Movement of the slide 10 in one direction is controlled by a spring-biased pin 19, Fig. 2, constantly urged to bear against the peripheral surface of a rotatable stopblock 20 journaled in the slide 10. The stopblock 20 is drivably connected to a drive disc 21 having inclined surfaces 22 machined into the face of the disc in a manner that during rotation of the drive disc 21 in one direction, the dropoff of the inclined surfaces 22 will engage spring-loaded clutch pins 23 carried in the stopblock 20 to drive the stopblock 20 and when the drive disc 21 is rotated in the opposite direction, the clutch pins 23 merely ride up the inclined surfaces 22 and drop off and again ride up the inclined surfaces 22, the process of the clutch pins 23 riding up the inclined surfaces 22 and dropping off continues as the drive disc 21 continues rotating. The drive disc 21 is connected to a shaft 24 journaled in the slide member 10 carrying a gear 25 fixed thereto which is disposed to engage a rack 26 attached to the fixed block 12. Hence as the slide 10 is caused to be moved by the air cylinder through the piston rod 14, the gear 25 is rotated by the rack 26 and therefore, the stopblock 20 is rotated through the clutch pins 23, when rotating the drive disc 21 in the proper direction and movement of the slide 10 in the direction to cause this rotation is then limited by the stop pin 19 engaging a notch in the peripheral surface of the stopblock 20.

Figure 4:
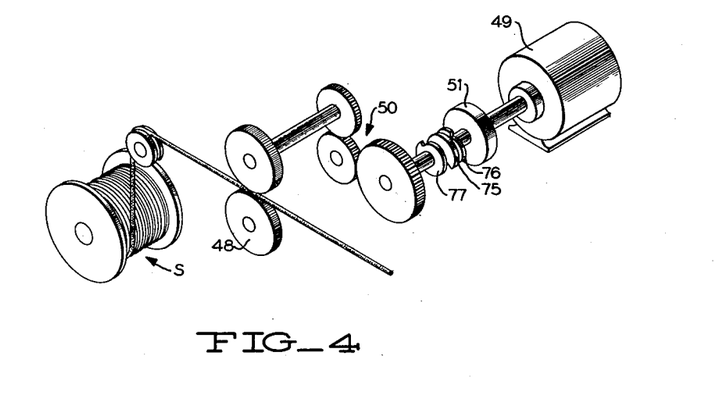
Fig. 4 is a perspective view of the wire feeding mechanism.

The end of the wire coming from the supply of wire S, Fig. 4, is threaded through the wire guide 15 and into a groove 27 in a rotatable gripper block 28 fixed to the stopblock 20. The groove 27 extends inward from and around the periphery of the gripper block 28 which also has a slot 29 extending longitudinally therethrough to accommodate a slideable cam plate 30 as well as vertically extending holes 31 and 32 to accommodate gripping pins 33 and 34 biased by springs 35 and 36, respectively. The cam plate 30 is slotted to permit the gripping pins 33 and 34 to extend therethrough. However, the cam plate 30 provided with cam surfaces 37 and 38 to alternately actuate the gripping pins 31 and 32 acts against shoulders 39 and 40 on the gripping pins 33 and 34, respectively, as it is caused to be moved laterally, thereby camming the pins 31 and 32 alternately into and out of gripping positions. The springs 35 and 36 cause the pins 31 and 32 to follow the cam surfaces 37 and 38 and provide the pressure for holding the pins 31 and 32 in a gripping position. Hence the wire 2 is first threaded into the slot 27 with one of the pins in the nongripping position, the cam plate 30 is moved so that the wire 2 is gripped. Means for moving the cam plate 30 consists of a spring-loaded drive pin 41 carried in a slideable block 42 adapted to move in a guide block 43 attached to the fixed block 12. Movement of the slideable block 42 is at right angles to movement of the slide member 10. An air cylinder, not shown, having a piston rod 44 connected to the slideable block 42 drives the block 42 toward and away from the slideable cam plate 30. The slideable block 42 also carries a knife 45 for cutting off the wire gripped in the groove 27 of the gripping block 28 by a gripping pin. The knife 45 is adapted to enter one of two identical cutouts 46 provided in the gripping block 28 where the cutouts also provide a cooperating surface for the knife 45 during the cutting operation. The drive pin 41 is disposed in the slideable block 42 in a manner that it will engage the slideable cam plate 30 and move it laterally until the slideable cam plate 30 strikes a stop pin 47 secured in the fixed block 12, so that the pin which had been gripping the end of the wire 2 releases its grip and the nongripping pin moves into a gripping position to grip the wire 2 from the supply S prior to the knife 45 severing the wire 2. Hence as the wire 2 is severed from the supply S, the newly created end from the supply S will be gripped. It is necessary to spring load the drive pin 41 so as to allow further travel of the slideable block 42 to move the knife 45 into the cutting position, since the drive pin 41 has moved the slideable cam plate 20 into the stop pin 47. When forming the loop 4 of wire 2 after rotation of the gripping block 28, wire 2 is fed from the wire supply S by the wire feeding device 3 comprising a pair of female knurled feed rolls 48, Fig. 4, driven from a power source 49 through gearing 50 and a one-revolution clutch 51. By changing gear ratios, the length of the wire loop 4 formed can be varied, of course a cam and linkage arrangement could be used to drive the feed rollers, and the length of the loop of wire could be varied by changing the cam and linkage arrangement.

Figure 3:
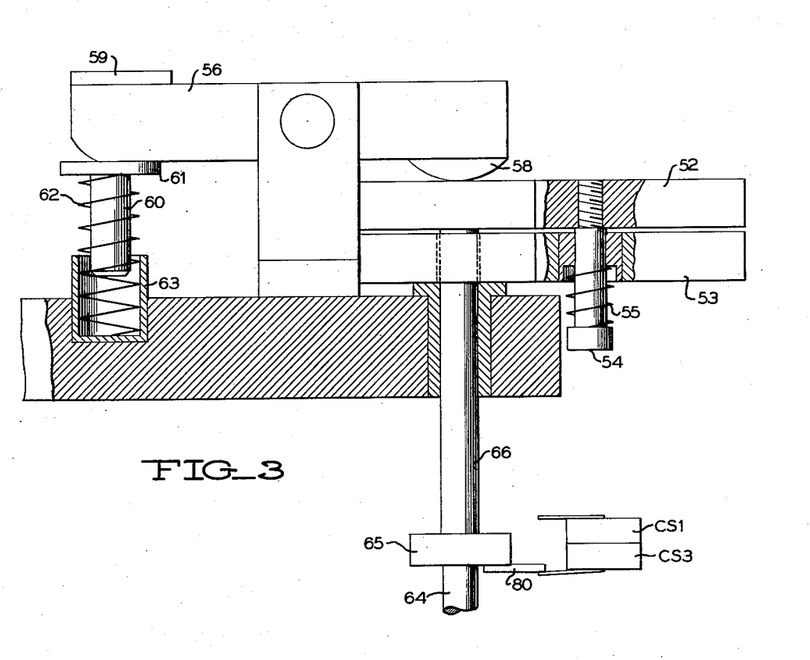
Fig. 3 is a detail view in side elevation partially in section and partially in full line of the wire gripping mechanism.

As the loop 4 is forming, it enters the wire gripper means 5 Figs. 1 and 3 brought into alignment with the forming loop 4 by the rotatable carrier 6. The gripper means 5 consists of an upper gripper plate 52 and a lower gripper plate 53 held together by a pair of bolts 54 threaded into the upper gripper plate 52 and passing through the lower gripper plate 53. The bolts 54 are biased by springs 55 to maintain the lower plate 53 in position with respect to the upper plate 52. The upper and lower gripping plates are normally held in a gripping position by a lever assembly consisting of a pair of parallel spaced arms 56 pivotally supported intermediate their ends and joined together at one end by a clamp block 57 having a projection 58 adapted to bear against the top surface of the upper gripping plate 52. The other ends of the arms 56 held in a spaced relation by a tie bar 59 carry depending pins 60 having spring pads 61 and biased by springs 62 retained in spring cups 63 in a manner that the arms 56 pivot clockwise and the projection 58 is caused to bear against the top surface of the plate 52, thereby holding the upper and lower gripping plates 52 and 53, respectively, in a gripping position. The upper and lower gripping plates 52 and 53, respectively, are actuated into a nongripping relationship by an air cylinder, not shown, having a piston rod 64 disposed to bear against a longitudinal lift bar 65 fixed to one end of a pair of parallel spaced lift pins 66. The lift pins 66 pass through the lower gripper plate 53 and are doweled into an upper gripper plate 52. Hence as the piston rod 64 is extended, it moves the upper plate 52 from contact with the lower plate 53 through the lift bar 65 and the lift pins 66. The lower plate 53 has two parallel spaced longitudinal channels 53a and central pedestal 53b therebetween. The channels 53a are adapted to receive corresponding parallel spaced longitudinal tongue members 52a depending from the upper plate 52 which is also provided with a central channel 52b for receiving the central pedestal 53b, but with an opening therebetween even though the wire gripper means 5 is in its closed position. The wire loop 4, as it is being formed, develops a progressing arch portion 4a, Fig. 10d, tapering from the legs 7 which enters the channel 52b to pass therethrough. A guide tube 67 is provided to guide the forming loop of wire as it leaves the channel 52b and is fixed between frame members 68 pivotally supporting the arms 56 by pins 69 and fixed to a base member 70 of the carrier 6. The mechanism for establishing the spacial relationship of the wire forming the legs 7 of the wire loop 4 comprises the spreader plate 8 having two identical V-shaped cutouts 72 located above the wire loop 4 and adapted to be moved into position so that the legs 7 projecting from the wire gripping means 5 enter the V-cutouts, whereby the distance between the legs 7 of the loop 4 is established by the spreader plate 8 forcing the same against the sides of the central channel 52b, Fig. 9c. The spreader plate 8 is fixed to a block 73 carried on the end of a piston rod 74 fixed to an air cylinder, not shown, which drives the spreader plate 8 into and out of position to space the legs 7 of the loop 4.

*Electrical controls*

Contact switches CS, circuit breakers CB, solenoids S and relays R are provided to control the sequence of operations. From the above description it will be recalled that there are four air cylinders, one for operating the slide 10, one for operating the knife 45, one for operating the gripper plate 52 and one for operating the spreader plate 8.

In general the contact switches CS are actuated to open and closed positions by members, to be described in detail, moved through the piston rods of the air cylinders and the circuit breakers CB are cam operated by cams 75, 76, and 77 fixed on the drive shaft from the power source 49 through the clutch 51. The contact switches CS, circuit breakers CB, solenoids S and relays R are connected by circuitry in a manner shown in Fig. 5. The solenoids S which control operation of the air cylinders are controlled both by the contact switches CS and circuit breakers CB. The circuit breakers CB operate only after the one revolution clutch 51 is engaged with the power source 49. The circuitry connecting the contact switches CS, solenoids S, relays R and circuit breakers CB consists of a circuit from the plus side of a 110 v. D.C. supply to a manually operated start key SK and from the start key SK to a solenoid S1 for extending the piston rod 64 for opening the gripper plate 52 from the gripper plate 53. The solenoid S1 is connected to the minus side of the 110 v. D.C. supply to complete the circuit. When the piston rod 64 for opening the gripper plate 52 from the gripper plate 53 extends a finger 80 fixed on the lift bar 65 closes a contact switch CS1 connected to the plus side of the supply and to a relay R1 connected between the switch CS1 and to the minus side of the supply. The relay R1 controls a normally open relay contact R1a and a normally closed relay contact R1b. The normally open relay contact R1a is connected in series with the plus side of the supply between the points where the contact switch CS1 is connected to the plus side of the supply and where a common contact of a transfer relay R2 having two contacts is connected to the plus side of the supply. The common contact of the transfer relay R2 is normally closed with a contact point connected to the solenoid S2 for operating the one revolution clutch 51; the solenoid S2 is also connected to the minus side of the supply. The other contact of the transfer relay being normally open is connected to the relay R2 which is also connected to the minus side of the supply.

Figure 5:
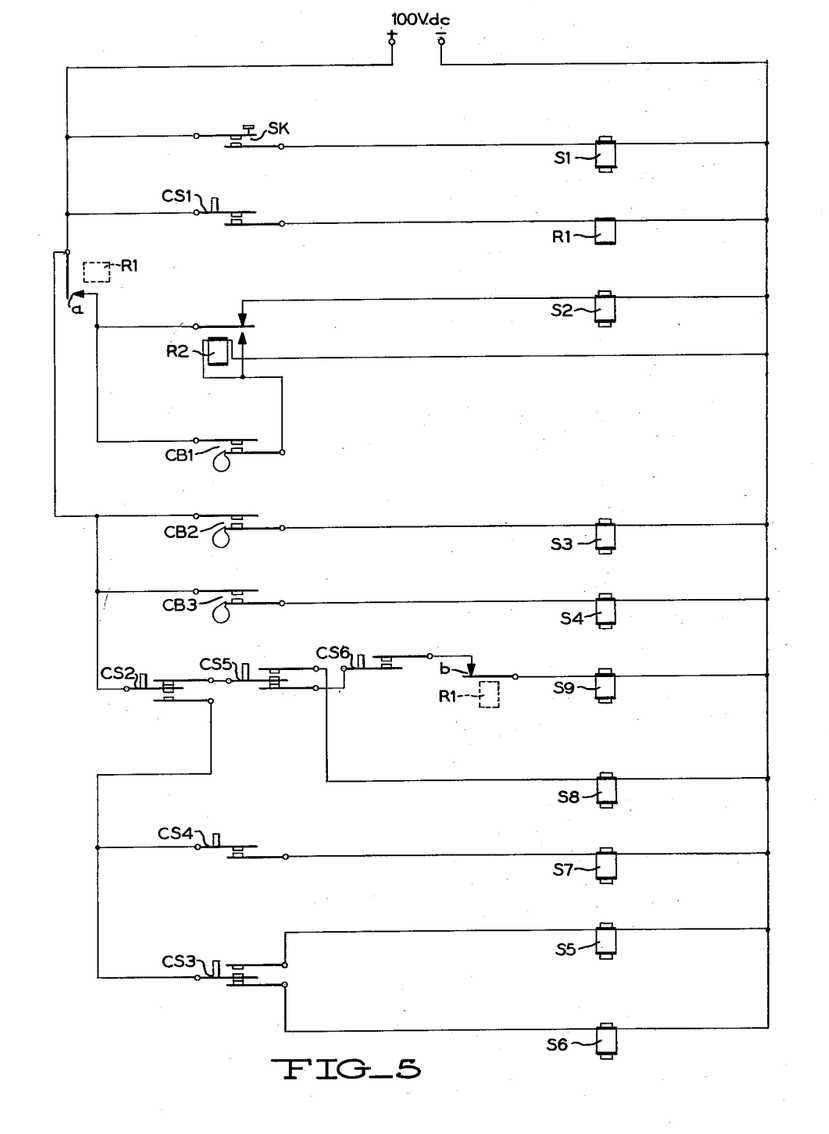
Fig. 5 is a circuit diagram for the apparatus illustrated in Fig. 1.
Figure 6:
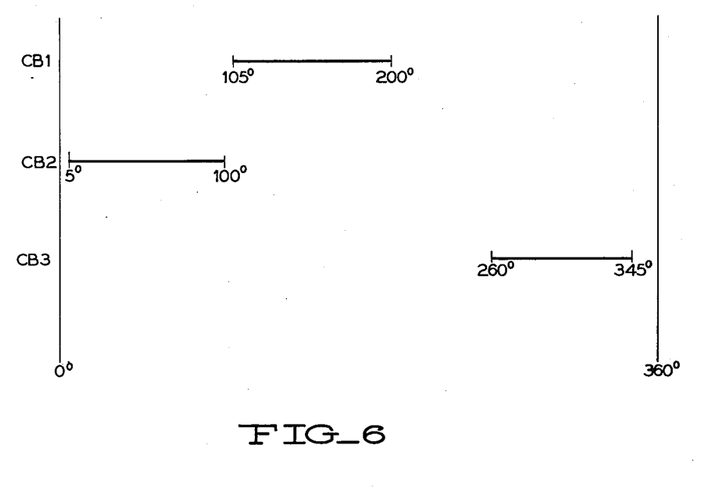
Fig. 6 is a timing diagram of the circuit breakers.

A circuit breaker CB1 is connected between the transfer relay R2 and the normally open relay contact and the plus side of the supply through the normally open relay contact R1a. The circuit breaker CB1 closes by action of a cam 75 about 105° after the one revolution clutch 51 is engaged and remains closed until about 200°.

A circuit breaker CB2 is connected between the plus side of the supply and a solenoid S3 for causing the piston rod 14 to extend the movable slide 10 toward the carrier 6; the solenoid S3 also is connected to the minus side of the supply. The circuit breaker CB2 closes by action of the cam 76 about 5° after the one revolution clutch 51 is engaged and remains closed until 100°.

A circuit breaker CB3 is connected between the plus side of the supply and a solenoid S4 for causing the piston rod 74 to extend the spreader plate 8; the solenoid S4 is connected between the circuit breaker CB3 and the minus side of the supply. The circuit breaker CB3 closes by action of the cam 77 about 260° after the one revolution clutch 51 is engaged and remains closed nearly 345°. Extension of the spreader plate 8 causes the common contact of a contact switch CS2 connected to the plus side of the supply to leave a normally closed contact and establish a connection with a normally open contact, thereby completing a circuit from the plus side of the supply to a contact switch CS3 having a common contact in contact with a normally open contact which is connected to a solenoid S5 for causing the gripper plate 52 to close on the gripper plate 53; the common contact of the switch CS3 transferred to the normally open contact of the switch CS3 when the piston rod 64 for opening the gripper plate 52 from the gripper plate 53 was extended, however, a circuit to the plus side of the supply and to the solenoid S5 for causing the closing of the gripper plate 52 on the gripper plate 53 was not completed until the common contact of the contact switch CS2 was transferred to the normally open contact.

As the piston rod 64 for opening the gripper plate 52 from the gripper plate 53 retracts, the common contact of the contact switch CS3 is transferred to the normally closed contact which is connected to a solenoid S6 for causing the knife 45 to advance to cut the wire 2 to disassociate the loop 4 from the wire supply S; the solenoid S6 is connected between the normally closed contact of the contact switch CS3 and the minus side of the supply. As the knife 45 advances to cut the wire 2 a finger 81 on the slideable block 42 for extending the knife 45 closes a contact switch CS4 thereby establishing a circuit to a solenoid S7 for causing the spreader plate 8 to retract, the solenoid S7 is connected between the contact switch CS4 and the minus side of the supply and the contact switch CS4 is connected to the plus side of the supply through the contact switch CS2 which had its common contact in connection with its normally open contact thereby completing a circuit to the plus side of the supply. When the spreader plate 8 is caused to retract a finger 81 on the block 73 allows the common contact of the contact switch CS2 to transfer from the normally open contact to the normally closed contact to complete a circuit to a contact switch CS5 having a common contact in connection with the normally open contact, this transfer having taken place when the knife 45 was moved to the cut-off position. Hence there is a circuit established to a solenoid S8 for retracting the knife 45 from the cutting position, the solenoid S8 is also connected to the minus side of the supply. As the knife 45 retracts from the cutting position, the common contact of the contact switch CS5 transfers to the normally closed contact of contact switch CS5 thereby completing a circuit to a solenoid S9 for retracting the movable slide 10 through a contact switch CS6, which is normally held open by a finger 83 fixed to slide 10 when the movable slide 10 is in its retracted position or furthest away from the carrier; however, since the movable slide is extended, the contact switch CS6 is closed and there is a complete circuit to the relay contact R1b which is normally closed when the gripper plate 52 is closed on gripper plate 53. The solenoid S9 is connected also to the minus side of the supply.

*Mode of operation*

Wire 2 is drawn from the supply roll S, Fig. 4, and threaded through the feed rollers 48 into the guide tube 17 and through the guide tube to the wire rotating means 1. The movable slide member 10 is in its extended position or nearest the carrier during the threading operation; hence before starting a cycle of operation, the wire having been threaded into and gripped by the wire rotating mechanism, the movable slide 10 is retracted thereby rotating the end of the wire 180°. With the threading of the wire having been accomplished and the movable slide 10 in its home or retracted position, the end of the wire having been rotated 180°, the machine is ready for a cycle of operation. The machine controls are connected in a manner that the machine will automatically go through one cycle of operation; however, continuous operation could easily be effected. To initiate a cycle of operation the start key SK is depressed thereby completing the circuit from the plus side of the supply to the solenoid S1 which then becomes energized to cause the piston rod 64 to extend to open the gripper plate 52 from the gripper plate 53. Piston rod 64 remains extended until solenoid S5 is energized. However, as the piston rod 64 is extended, the normally open contact switch CS1 is closed to complete a circuit from the plus side of the supply through the relay R1 to the minus side of the supply; and the common contact of the contact switch CS3 transfers from the normally closed contact to the normally open contact thereby establishing a circuit from the normally open contact of contact switch CS2 to the solenoid S5 and from the solenoid S5 to the minus side of the supply. With the relay R1 energized the normally open relay contact R1a closes and the normally closed relay contact R1b opens. The closing of the relay contact R1a causes solenoids S2 to become energized and completes a circuit from the plus side of the supply through the normally closed contact of relay R2 to the solenoid S2 and from the solenoid S2 to the minus side of the supply. Energization of solenoid S2 causes the clutch 51 to become engaged with the power source 49, and once the clutch 51 is engaged with the power source 49 it revolves for one revolution. With the clutch 51 engaged the feed rollers 48 start to feed wire 2 from the wire supply S and thereby start the loop 4 to form while the wire rotating means 1 is still in the home position. However, as it will be seen shortly, the wire rotating means 1 is advanced toward the carrier 6 just after the wire feeding device 3 starts feeding wire to form the loop 4, as in Fig. 10d. During the feeding operation, circuit breaker CB2 is closed by the cam 76 at 5° after the clutch 51 is engaged and remains closed until 100° after the clutch 51 is engaged. The closing of the circuit breaker CB2 establishes a circuit from the plus side of the supply to the solenoid S3 and from the solenoid S3 to the minus side of the supply. As the solenoid S3 is energized the movable slide 10 is moved toward the carrier; hence shortly after the feeding of the wire has been started the wire rotating mechanism has been moved into close proximity with the wire gripper means 5 and further the movable slide 10 remains in the position closest to the carrier until the solenoid S9 is energized. As the wire rotating means 1 reaches its position closest to the carrier 6, the loop is still being formed and the progressing arch portion 4a enters the channel 52b, Fig. 10e, and passes therethrough into the guide tube 57, as in Fig. 8. Circuit breaker CB1 is closed by the cam 75 at about 105° after the clutch 51 is engaged to energize relay R2 and, to complete a circuit from the plus side of the supply through the relay contact R1a which had been closed as piston rod 64 was extended to the relay R2 and from the relay R2 to the minus side of the supply. As relay R2 is energized it causes its common contact to transfer from the normally closed contact to the normally open contact thereby opening the circuit for energizing solenoid S2. The circuit breaker CB1 remains closed until 200° after the clutch 51 is engaged. The relay R2 remains energized until the relay point R1a opens and then the common contact of the relay R2 transfers from the normally open contact to the normally closed contact.

Circuit breaker CB3 closes by action of the cam 77 at about 260° after the clutch 51 is engaged and remains closed until about 345° after the clutch 51 is engaged. Closing of the circuit breaker CB3 establishes a circuit from the plus side of the supply to the solenoid S4 and from the solenoid S4 to the minus side of the supply. As the solenoid S4 is energized the piston rod 74 moves the spreader plate 8 downward to engage the legs 7 of the loop 4 and properly space them. It is to be noted that the gripper plate 52 is opened from the gripper plate 53; hence the spreader plate 8 may freely establish the proper spacing of the legs 7 of the loop of wire. The piston rod 74 remains extended until the solenoid S7 is energized. As the piston rod 74 extends, the common contact of the contact switch CS2 transfers from the normally closed contact to the normally open contact thereby establishing a circuit from the plus side of the supply to the contact switch CS3 and the contact switch CS4; however, the contact switch CS4 is open, but the common contact of the contact switch CS3 had been transferred to the normally open contact to complete a circuit through the solenoid S5 to the minus side of the supply; hence since the contact switch CS3 is now connected to the plus side of the supply through the contact switch CS2, the solenoid S5 will be energized thereby retracting the piston rod 64 and allowing the gripper plate 52 to close upon the wire loop, the feeding of the wire loop has been completed by this time. The wire loop has now been gripped tightly between the gripper plates 52 and 53 while the spreader plate 8 was still extended to maintain the proper spacing of the legs of the wire loop and hence the knife 45 may be advanced to cut the wire loop from the supply. As the piston rod 64 is retracted the common contact of the contact switch CS3 is transferred from the normally open contact to the normally closed contact thereby establishing a circuit from the plus side of the supply to the solenoid S6 for advancing the knife 45 into the cut-off position to cut the wire loop from the wire supply. Of course, as the knife 45 is advanced to the cut-off position the drive pin 41 engages the cam plate 30 and slides it laterally thereby camming the pin 34 into gripping position and camming the pin 33 out of gripping position. Hence when the wire loop 4 is severed from the wire supply S the ends of the wire loop will be free and the end of the wire from the supply will be gripped. Moreover, as the knife 45 is advanced to the cut-off position, the contact switch CS4 is closed thereby completing a circuit to energize the solenoid S7 which causes the piston rod 74 to move to retract the spreader plate 8. As the piston 74 retracts the common contact of the contact switch CS2 transfers to the normally closed contact. The common contact of the contact switch CS5 transferred from the normally closed contact to the normally open contact when the knife 45 advanced to the cut-off position, hence there is a circuit from the plus side of the supply through the contact switches CS2 and CS5 to the solenoid S8 and from the solenoid S8 to the minus side of the supply. As the solenoid S8 is energized the knife 45 is retracted from the cut-off position thereby transferring the common contact of the contact switch CS5 from the normally open contact to the normally closed contact; hence a circuit is established to energize the solenoid S9 and thereby retract the slide 10 to its home position. When the slide 10 returns to its home position one cycle of operation is completed and the apparatus is in condition to proceed through another cycle of operation by closing of the switch SK.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A device for cutting and orienting wire from a supply of wire comprising: a wire rotating member provided with gripper elements adapted to grip the leading end of the wire and to orient said leading end of wire in an opposite direction to that of the wire extending from the supply, means for rotating said wire rotating member after one of said gripper elements has gripped the leading end of the wire so as to orient said leading end in said opposite direction, means for feeding a predetermined amount of wire from said supply with said gripped leading end of wire in its oriented position so as to form a loop of wire, guiding means for guiding the loop of wire being formed, means for cutting said wire fed from said supply in a manner that a predetermined length of wire will be formed with the ends facing in the same direction, and means for causing said one of said gripper elements of said wire rotating member just prior to the cutting of the wire to release the oriented end of the wire and for causing another of said gripper elements to establish a grip on the end of the wire from the supply to be formed by the cutting of the wire.

2. A device for cutting and orienting wire from a supply of wire comprising: a wire rotating member provided with two alternately operative wire grippers for gripping the leading end of the wire, means for rotating said wire rotating member a predetermined amount after one of said wire grippers has gripped the leading end of the wire, means operative after rotating said wire rotating member for feeding a predetermined amount of wire to thereby form a loop of wire, guiding means for guiding the loop of wire being formed, means for cutting the wire fed to a predetermined length from the remaining supply to sever the loop therefrom and permit the ends thereof to face in the same direction, and means carried by said cutting means for operating said alternately operative wire grippers prior to the cutting of the wire so that said one of said wire grippers releases its grip upon the leading end of the wire and the other wire gripper establishes a grip upon the end of the wire from the supply to be formed by the cutting of the wire.

3. In a device for cutting and orienting wire from a supply of wire comprising: a wire rotating member provided with alternately gripping wire grippers and operable in a manner that the leading end of the wire is gripped by one of the wire grippers and oriented in an opposite direction to that of the wire extending from the supply and that the other wire gripper of said wire grippers is brought into wire gripping position, means for rotating said wire rotating member to orient the gripped wire end in said opposite direction, and bring said other wire gripper into wire gripping position, means for feeding a predetermined amount of wire through said other wire gripper and with the end of the wire in its oriented position so as to form a loop of wire with the ends thereof facing in the same direction, guiding means for guiding the loop of wire being formed, means for actuating said alternately gripping wire grippers after feeding said predetermined amount of wire so that said one of the wire grippers releases its grip on the oriented end of the wire and said other wire gripper grips the wire fed therethrough, and means for cutting the predetermined fed amount of wire so that a predetermined length of wire is formed and the newly formed end of wire from said wire supply is being gripped by said other wire gripper.

4. In a device for cutting and orienting wire from a supply of wire comprising: a wire rotating member provided with alternately gripping wire grippers and operable in a manner that the leading end of the wire is gripped by one of the wire grippers and oriented in an opposite direction to that of the wire extending from the supply and that the other wire gripper of said wire grippers is brought into wire gripping position, means for rotating said wire rotating member to orient the wire end in said opposite direction and bring the other wire gripper into position to grip the wire, means for feeding a predetermined amount of wire through said other wire gripper with the end of the wire in its oriented position to form a loop of wire, means for guiding the loop of wire being formed as wire is fed through said other wire gripper, loop gripping means adapted to grip the formed loop of wire after the wire has been fed out to the predetermined amount, means for establishing a fixed lateral spatial relationship between the wire passing through said other wire gripper and the gripped wire end before the loop of wire is gripped, means operative after establishing said fixed lateral spatial relationship for actuating the loop gripping means to grip the loop of wire, means for actuating said alternately gripping wire grippers after said loop gripping means grips said loop of wire so that said one of the wire grippers releases its grip on the oriented end of wire and said other wire gripper grips the wire passing therethrough, and means for cutting the formed loop of wire from said supply of wire to leave the loop of wire disassociated therefrom and the newly formed end of wire from said supply gripped by said other wire gripper.

5. In a device for cutting and orienting wire from a supply of wire according to claim 3 wherein said means for actuating said alternately gripping wire grippers is carried by said cutting means in a manner that the alternately gripping grippers are actuated prior to the cutting of the predetermined fed amount of wire.

6. In a device for cutting and orienting wire from a supply of wire according to claim 4 wherein said means for actuating said alternately gripping wire grippers is carried by said cutting means in a manner that the alternately gripping wire grippers are actuated prior to the cutting of the predetermined fed amount of wire.

7. In a device for cutting and orienting wire from a supply of wire comprising: a wire rotating member provided with alternately gripping wire grippers and operable in a manner that the leading end of the wire is gripped by one of the wire grippers and oriented in an opposite direction to that of the wire extending from the supply and that the other wire gripper is positioned to grip the wire; means for operating said wire rotating member so that the leading end of the wire is gripped by one of the wire grippers and oriented in said opposite direction and that the other wire gripper is positioned to grip the wire; means for feeding a predetermined amount of wire through the other wire gripper thereby forming a wire loop with two legs, one end of the loop being gripped by said one of the wire grippers and the other end of the loop being contiguous with said wire supply; guiding means for guiding the loop of wire being formed; means for spacing the legs of the wire loop a predetermined distance apart; loop gripping means for gripping the legs of said wire loop after the spacing therebetween has been established; means for actuating said alternately gripping wire grippers so that the ends of said wire loop are free and that the end of said wire supply contiguous with one end of said wire loop is gripped; and means for cutting the wire to disconnect said wire loop from said wire supply.

8. In a device for cutting and orienting wire from a supply of wire comprising: a wire rotating member provided with alternately gripping wire grippers and movable toward and away from said wire supply and operable in a manner that one of the wire grippers grips the leading end of the wire when the rotating member is furthest away from the wire supply and orients said end of the wire in an opposite direction to that of the wire extending from the supply as it is moved toward the wire supply, thereby bringing the other wire gripper of said wire grippers into position to permit the feeding of wire from the supply therethrough; means for operating said wire rotating member as the same is moved toward said wire supply so as to cause said one of the wire grippers to grip said end of the wire and to orient the same in said opposite direction and thereby bring the other gripper into position to permit the feeding of wire from the wire supply therethrough; means for feeding a predetermined amount of wire with said wire rotating member furthest away from the wire supply and with said wire end in said oriented position thereby forming a loop of wire; guiding means for guiding the loop of wire being formed; means for severing said formed loop of wire from said wire supply; and means for moving said wire rotating member away and toward said wire supply to bring the rotating member into a loop forming position before the wire is fed and to clear the rotating member from the loop after severing the loop from the wire supply.

9. In a device for cutting and orienting wire from a supply of wire comprising: a wire rotating member provided with alternately gripping wire grippers and movable toward and away from said wire supply and operable in a manner that one of the wire grippers grips the leading end of the wire when the rotating member is furthest away from the wire supply and orients said end of wire in an opposite direction to that of the wire extending from the supply as it is moved toward the wire supply, thereby bringing the other wire gripper of said wire grippers into position to permit the feeding wire from the supply therethrough; means for operating said wire rotating member as the same moves toward said wire supply so as to cause said one of the wire grippers to grip said end of the wire from the supply and to orient said end of the wire in said opposite direction and bring the other wire gripper into position to permit the feeding of wire from a supply therethrough; means for feeding a predetermined amount of wire with said wire rotating member furthest away from the supply and with said wire end in said oriented position, thereby forming a loop of wire; guiding means for guiding the loop wire being formed; means for severing said formed loop of wire from said wire supply; means for actuating said wire grippers prior to severing said formed loop so that said one of the wire grippers releases its grip upon said end of the wire and the end of the wire to be formed is gripped by said other gripper; and means for moving said wire rotating member away from said wire supply to a loop forming position and toward said wire supply after the loop has been formed so as to clear the rotating member from the loop after the same is severed from said supply.

10. In a device for cutting and orienting wire from a supply of wire comprising: a wire rotating member provided with alternately operative wire grippers and movable toward and away from said wire supply, and operable in a manner that one of the wire grippers grips the leading end of the wire when the rotating member is furthest away from the wire supply and orients said end of the wire in an opposite direction to that of the wire extending from the supply as it is moved toward the wire supply, thereby bringing the other wire gripper of said wire grippers into position to permit the feeding of wire from the supply therethrough; means for operating said wire rotating member as the same moves toward said wire supply so as to cause said one of the wire grippers to grip said end of the wire and to orient the same in said opposite direction and thereby bring the other gripper into position to permit the feeding of wire from the wire supply therethrough; means for feeding a predetermined amount of wire with said wire rotating member furthest away from the wire supply and with said gripped wire end in said oriented position, thereby forming a loop of wire with two legs; guiding means for guiding the loop of wire being formed; means for establishing a predetermined spatial relationship between the legs of the so-formed loop of wire; means for severing said loop of wire from said wire supply after establishing said spatial relationship of the legs of the loop; means for actuating said wire grippers prior to severing said formed loop so that the gripped end of the wire is released and the end of the wire to be formed by severing the loop from the supply will be gripped; and means for moving said wire rotating member away and toward said wire supply to bring the rotating member into a loop-forming position before the wire is fed and to subsequently clear the rotating member from the loop after severing the loop from the wire supply.

11. Apparatus for forming a loop of wire from a supply of wire comprising: a rotatable member provided with gripper elements, said gripper elements each being adapted to grip the leading end of the wire; means for rotating said rotatable member after one of said gripper elements has gripped the leading end of the wire so that said gripped end is oriented in an opposite direction to that of the wire extending from the supply; means for feeding a predetermined amount of wire from said supply with said gripped end oriented in said opposite direction so as to form a loop of wire, one leg of said loop being contiguous with said supply of wire; and guiding means for guiding the loop of wire as it is formed.

12. Apparatus for forming a loop of wire from a supply of wire comprising: a rotatable member provided with gripper elements, said gripper elements each being adapted to grip the leading end of the wire, said rotatable member normally positioned away from said supply of wire with said end of the wire being gripped by one of said gripper elements; moving means for moving said rotatable member toward and away from said supply of wire; means for rotating said rotatable member so as to orient said gripped end of the wire in an opposite direction to that of the wire extending from the supply; means for actuating said moving means in a manner to move said rotatable member toward said supply of wire as the rotatable member is rotated and to move said rotatable member away from said supply of wire after the rotatable member has been rotated; means for feeding a predetermined length of wire from said supply of wire as said rotatable member is being moved away from said supply of wire, thereby forming a loop of wire, one leg of said loop being contiguous with said supply of wire; and guiding means for guiding the loop of wire as it is formed.

13. Apparatus as described in claim 12 further comprising: gripping means for gripping said loop of wire so as to maintain said loop of wire in a loop.

14. Apparatus as described in claim 13 further comprising: means for disconnecting said loop of wire from said supply after said gripping means has gripped said loop of wire.

15. Apparatus as described in claim 14 further comprising: means for actuating said gripper elements prior to disconnecting said loop of wire from said supply and after said gripping means grips said loop of wire, whereby said one of said gripper elements gripping said end of the wire releases its grip and another gripper element grips the end of the wire of the wire supply to be formed upon disconnecting the loop of wire from said supply.

16. Apparatus of the type described comprising: a rotatable carrier adapted to be moved about a central axis in increments; a plurality of arcuately spaced gripping devices disposed upon said carrier to move therewith so that said gripping devices are progressively advanced into a predetermined position, said gripping devices being adapted to receive and grip a loop of wire with the ends thereof extending outwardly therefrom; a rotatable member for orienting one end of a wire extending from a supply of wire, said rotatable member being movable between said carrier and wire supply in a given plane; wire gripper elements carried by said rotatable member, each being adapted to grip the leading end of the wire, normally the leading end is gripped by one of said gripper elements prior to rotation of said rotatable member; means for rotating said rotatable member so as to orient said gripped end of the wire in an opposite direction to that of the wire extending from the supply; movable means for moving said rotatable member between said carrier and wire supply; means for operating said movable means in a manner to move said rotatable member toward said wire supply as said rotatable member is being rotated to orient said end of the wire in said opposite direction and to move said rotatable member toward said carrier after said rotatable member has been rotated to orient said gripped end of the wire in said opposite direction; feeding means for feeding wire from said supply as said rotatable member is being moved toward said carrier so as to form a loop of wire, the arch portion of the loop entering one of the gripping devices advanced to said predetermined position; means for actuating said one of the gripping devices to grip the loop of wire entered therein after the same is fully formed; and means for severing the loop from the supply wire after the same has been gripped by said one of the gripping devices.

17. Apparatus as in claim 16 further comprising: means for operating upon said loop of wire after the same has been formed by said feeding means and prior to actuation of said one of the gripper devices so as to establish a predetermined spacing between the legs of the loop of wire.

References Cited in the file of this patent
UNITED STATES PATENTS

| | | |
|---|---|---|
| 1,319,163 | Mills | Oct. 21, 1919 |
| 1,567,107 | Bonn | Dec. 29, 1925 |
| 1,655,747 | Wagner | Jan. 10, 1928 |
| 1,783,620 | Johnson | Dec. 2, 1930 |
| 1,799,236 | Hunt | Apr. 7, 1931 |
| 1,839,332 | Norton | Jan. 5, 1932 |

UNITED STATES PATENT OFFICE
Certificate of Correction

March 28, 1961

Patent No. 2,976,895

Raymond E. Durham, Jr.

It is hereby certified that error appears in the above numbered patent requiring correction and that the said Letters Patent should read as corrected below.

In the drawings, Sheet 1, containing Fig. 1, should appear as shown below instead of as in the patent:

FIG. 1

Sheet 2, containing Figs. 2 and 3, should appear as shown below instead of as in the patent:

Sheet 3, Fig. 4 should appear as shown below instead of as in the patent:

FIG_4 column 2, between lines 28 and 29, in the center of the column, insert —*General*—; line 42, for "if" read —of—; same column 2, line 44, for "and" read —are—.

Signed and sealed this 26th day of September 1961.

[SEAL]

Attest:
ERNEST W. SWIDER,
*Attesting Officer.*

DAVID L. LADD,
*Commissioner of Patents.*